United States Patent
Yamada et al.

(10) Patent No.: US 9,819,691 B2
(45) Date of Patent: Nov. 14, 2017

(54) NETWORK MONITORING SYSTEM AND METHOD

(71) Applicant: FUJITSU LIMITED, Kawasaki-shi, Kanagawa (JP)

(72) Inventors: Masahiro Yamada, Kawasaki (JP); Masanobu Morinaga, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 76 days.

(21) Appl. No.: 14/950,096

(22) Filed: Nov. 24, 2015

(65) Prior Publication Data

US 2016/0191552 A1 Jun. 30, 2016

(30) Foreign Application Priority Data

Dec. 26, 2014 (JP) ................................ 2014-265798

(51) Int. Cl.
- G06F 21/56 (2013.01)
- H04L 29/06 (2006.01)
- H04L 12/26 (2006.01)
- H04L 29/02 (2006.01)

(52) U.S. Cl.
CPC ........ H04L 63/1416 (2013.01); H04L 43/062 (2013.01); H04L 43/12 (2013.01)

(58) Field of Classification Search
None
See application file for complete search history.

(56) References Cited

U.S. PATENT DOCUMENTS

| 7,051,369 | B1 * | 5/2006 | Baba ...................... H04L 63/02 726/22 |
| 7,895,649 | B1 * | 2/2011 | Brook ................... H04L 43/026 709/224 |
| 2002/0124084 | A1 * | 9/2002 | Furukawa ........... H04L 12/2854 709/225 |
| 2004/0172557 | A1 * | 9/2004 | Nakae ................. H04L 63/0227 726/22 |
| 2004/0252692 | A1 * | 12/2004 | Shim ...................... H04L 12/14 370/392 |

(Continued)

FOREIGN PATENT DOCUMENTS

| CA | 2328012 A1 * | 7/2001 | ......... H04L 41/0853 |
| JP | 2004-220373 | 8/2004 | |

(Continued)

*Primary Examiner* — Venkat Perungavoor
(74) *Attorney, Agent, or Firm* — Fujitsu Patent Center

(57) ABSTRACT

A disclosed network monitoring method includes: obtaining, by a first apparatus, packets from a node outside a network to a first terminal in the network, and packets from the first terminal to a second terminal in the network; transmitting, by the first apparatus and to a third apparatus, information on first plural packets that satisfy a first condition; obtaining, by a second apparatus, packets from the first terminal to the second terminal, and packets from the second terminal to the node; transmitting, by the second apparatus and to the third apparatus, information on second plural packets that satisfy a second condition; receiving, by the third apparatus, the information on the first and second plural packets; and determining, by the third apparatus, whether an attack from outside the network occurred, based on whether a same packet is included in the first and second plural packets.

8 Claims, 16 Drawing Sheets

(56) References Cited

U.S. PATENT DOCUMENTS

| | | | |
|---|---|---|---|
| 2005/0021740 A1* | 1/2005 | Bar | H04L 63/0236 709/224 |
| 2005/0125195 A1* | 6/2005 | Brendel | H04L 12/2602 702/182 |
| 2006/0021043 A1* | 1/2006 | Kaneko | H04L 12/28 726/24 |
| 2006/0185011 A1* | 8/2006 | Cromer | H04L 63/145 726/13 |
| 2006/0191006 A1* | 8/2006 | Satake | H04L 63/0227 726/22 |
| 2007/0067839 A1* | 3/2007 | Hamada | H04L 41/5009 726/22 |
| 2009/0232000 A1* | 9/2009 | Watanabe | H04L 43/00 370/235 |
| 2009/0241190 A1* | 9/2009 | Todd | G06F 21/53 726/23 |
| 2010/0031093 A1* | 2/2010 | Sun | G06F 21/552 714/45 |
| 2011/0197278 A1* | 8/2011 | Chow | H04L 63/1458 726/24 |
| 2011/0280149 A1 | 11/2011 | Okada et al. | |
| 2011/0317566 A1 | 12/2011 | Keeni | |
| 2012/0324573 A1* | 12/2012 | Kim | H04L 63/1458 726/22 |
| 2014/0215621 A1* | 7/2014 | Xaypanya | H04L 63/145 726/23 |
| 2015/0013005 A1 | 1/2015 | Yamada et al. | |
| 2015/0195294 A1 | 7/2015 | Yamada et al. | |

FOREIGN PATENT DOCUMENTS

| | | |
|---|---|---|
| JP | 2008-176753 | 7/2008 |
| JP | 2015-015581 | 1/2015 |
| JP | 2015-133547 | 7/2015 |
| WO | 2007/081023 | 7/2007 |
| WO | 2010/086907 | 8/2010 |

* cited by examiner

| TYPE | PROTOCOL | ROLE | CRITERIA FOR JUDGMENT OF AGGRESSION | CRITERIA FOR JUDGMENT OF RELATIONSHIP |
|---|---|---|---|---|
| 1 | TCP | INSTRUCTION FROM OUTSIDE | TRANSMISSION SOURCE IS IP ADDRESS OF OUTSIDE ORGANIZATION | |
| 2 | SMB | TRANSMISSION OF RAT FILE | DESIGNATED FIELD OF SMB IS SPECIFIC VALUE | - TRANSMISSION DESTINATION IP ADDRESS OF (1) AND TRANSMISSION SOURCE IP ADDRESS OF (2) ARE SAME<br>- TIME PERIOD BETWEEN OCCURRENCE OF (1) AND (2) IS EQUAL TO OR SHORTER THAN PREDETERMINED TIME PERIOD |
| 3 | SMB OR DCE/RPC | ACCESS TO SERVICE MANAGEMENT | DESIGNATED FIELD OF SMB IS SPECIFIC VALUE, OR, SESSION OF DCE/RPC IS ESTABLISHED | TRANSMISSION DESTINATION/SOURCE IP ADDRESSES ARE SAME AS (2) |
| 4 | SMB OR DCE/RPC | ACTIVATION OF SERVICE | DESIGNATED FIELD OF DCE/RPC IS SPECIFIC VALUE | TRANSMISSION DESTINATION/SOURCE IP ADDRESSES ARE SAME AS (2) |

FIG.7

| TYPE | PROTOCOL | ROLE | CRITERIA FOR JUDGMENT OF AGGRESSION | CRITERIA FOR JUDGMENT OF RELATIONSHIP |
|---|---|---|---|---|
| 2 | SMB | TRANSMISSION OF RAT FILE | DESIGNATED FIELD OF SMB IS SPECIFIC VALUE | TRANSMISSION DESTINATION/SOURCE IP ADDRESSES ARE SAME AS (2) |
| 3 | SMB OR DCE/RPC | ACCESS TO SERVICE MANAGEMENT | DESIGNATED FIELD OF SMB IS SPECIFIC VALUE, OR, SESSION OF DCE/RPC IS ESTABLISHED | TRANSMISSION DESTINATION/SOURCE IP ADDRESSES ARE SAME AS (2) |
| 4 | SMB OR DCE/RPC | ACTIVATION OF SERVICE | DESIGNATED FIELD OF DCE/RPC IS SPECIFIC VALUE | - TRANSMISSION DESTINATION IP ADDRESS OF (2) AND TRANSMISSION SOURCE IP ADDRESS OF (5) ARE SAME<br>- TRANSMISSION SOURCE IP ADDRESS OF (1) AND TRANSMISSION DESTINATION IP ADDRESS OF (5) ARE SAME<br>- TIME PERIOD BETWEEN OCCURRENCE OF (4) AND (5) IS EQUAL TO OR SHORTER THAN PREDETERMINED TIME PERIOD |
| 5 | TCP | RAT CONNECTION TO OUTSIDE | CONNECTION DESTINATION IS IP ADDRESS OF OUTSIDE ORGANIZATION | |

| ATTACKER IP ADDRESS | SPRING BOARD IP ADDRESS | TARGET IP ADDRESS | NEXT TYPE | INFORMATION USED FOR COMPARISON (TCP SEQUENCE NUMBER OF TYPE 4) | TIME WHEN PACKET WAS OBTAINED ||||| 
|---|---|---|---|---|---|---|---|---|---|
| | | | | | TYPE 1 | TYPE 2 | TYPE 3 | TYPE 4 | TYPE 5 |
| 10.0.1.1 | 192.168.0.2 | 192.168.10.3 | 3 | | 8:50:0.000 | 8:50:0.250 | | | - |
| | 192.168.30.4 | 192.168.40.5 | 5 | 12345 | - | 9:00:0.000 | 9:00:0.500 | 9:00:1.000 | |
| ... | ... | ... | ... | ... | ... | ... | ... | ... | ... |

FIG.10

| ATTACKER IP ADDRESS | SPRING BOARD IP ADDRESS | TARGET IP ADDRESS | INFORMATION USED FOR COMPARISON (TCP SEQUENCE NUMBER OF TYPE 4) | TIME WHEN PACKET WAS OBTAINED |||||
|---|---|---|---|---|---|---|---|---|
| | | | | TYPE 1 | TYPE 2 | TYPE 3 | TYPE 4 | TYPE 5 |
| 10.0.200.1 | 192.168.30.4 | 192.168.40.5 | 12345 | - | 9:00:0.000 | 9:00:0.500 | 9:00:1.000 | 9:00:2.000 |

| ATTACKER IP ADDRESS | SPRING BOARD IP ADDRESS | TARGET IP ADDRESS | INFORMATION USED FOR COMPARISON (TCP SEQUENCE NUMBER OF TYPE 4) | TIME WHEN PACKET WAS OBTAINED | | | | |
|---|---|---|---|---|---|---|---|---|
| | | | | TYPE 1 | TYPE 2 | TYPE 3 | TYPE 4 | TYPE 5 |
| 10.0.1.1 | 192.168.0.2 | 192.168.10.3 | 891011 | 8:50:0.000 | 8:50:0.250 | 8:55:0.000 | 8:55:0.100 | — |
| 10.0.200.1 | 192.168.30.4 | 192.168.40.5 | 12345 | 8:55:0.000 | 8:55:0.100 | 8:56:0.000 | 8:57:0.000 | — |
| ... | ... | ... | ... | ... | ... | ... | ... | ... |

FIG.12

| TYPE 2 | TYPE 3 | TYPE 4 |
|---|---|---|
| 600 | 100 | 300 |

FIG.16

| TYPE | PROTOCOL | ROLE | FREQUENCY (PACKETS/SEC) | EXTRACTION | USE IN COMPARISON |
|---|---|---|---|---|---|
| 2 | SMB | TRANSMISSION OF RAT FILE | 80 | NO EXTRACTION (ONLY EXTRACTED IN FIRST HALF) | NO |
| 3 | SMB OR DCE/RPC | ACCESS TO SERVICE MANAGEMENT | 12 | EXTRACTION (START PACKET) | YES |
| 4 | SMB OR DCE/RPC | ACTIVATION OF SERVICE | 20 | EXTRACTION | YES |
| 5 | TCP | RAT CONNECTION TO OUTSIDE | NOT MEASURED | EXTRACTION | NO (NO EXTRACTION IN FIRST HALF) |

FIG.17

| TYPE | PROTOCOL | ROLE | FREQUENCY (PACKETS/SEC) | EXTRACTION | USE IN COMPARISON |
|---|---|---|---|---|---|
| 2 | SMB | TRANSMISSION OF RAT FILE | 80 | NO EXTRACTION (ONLY EXTRACTED IN FIRST HALF) | NO |
| 3 | SMB OR DCE/RPC | ACCESS TO SERVICE MANAGEMENT | 20 | NO EXTRACTION (ONLY EXTRACTED IN FIRST HALF) | NO |
| 4 | SMB OR DCE/RPC | ACTIVATION OF SERVICE | 1 | EXTRACTION (START PACKET) | YES |
| 5 | TCP | RAT CONNECTION TO OUTSIDE | NOT MEASURED | EXTRACTION | NO (NO EXTRACTION IN FIRST HALF) | ously developed. In RAT propagation, an artful RAT that
NETWORK MONITORING SYSTEM AND METHOD

CROSS-REFERENCE TO RELATED APPLICATIONS

This application is based upon and claims the benefit of priority of the prior Japanese Patent Application No. 2014-265798, filed on Dec. 26, 2014, the entire contents of which are incorporated herein by reference.

FIELD

This invention relates to a network monitoring technique.

BACKGROUND

FIG. 1 illustrates an example of a targeted attack in which confidential information of a specific organization is the target. In the example in FIG. 1, an attacker's terminal that is outside an internal network of the organization transmits instruction packets A to a terminal (this terminal is a springboard) in the internal network. The springboard transmits packets B to another terminal of the internal network (this terminal is the target), which includes a RAT (Remote Administration Tool) that is malware controlled remotely, and causes the target to execute the malware. The target creates a new connection with the attacker's terminal, and transmits packets C that includes internal information of the target to the attacker's terminal. Furthermore, the target can also be used as a new springboard in spreading the RAT. Hereafter, spreading the RAT within the internal network of an organization will be called RAT propagation.

A signature method is known as a technique for detecting malware. The signature method is a technique that detects malware by defining a pattern of communication data for each kind of malware, and then comparing communication data that flows over a network with the patterns. However, in the signature method, it is only possible to detect malware for which patterns have already been created, and it is not possible to detect customized malware that has been uniquely developed. In RAT propagation, an artful RAT that has been uniquely developed may be used, so it may not be possible to detect an attack using the signature method.

Moreover, because packets related to RAT propagation are transmitted with normal packets, it is difficult to determine whether or not there is RAT propagation based on a single packet. For example, in the example in FIG. 1, the packets A and the packet C are disguised as normal web-access packets, so by simply checking an individual packet, whether or not there is RAT propagation can be determined. On the other hand, because plural terminals are related to RAT propagation, there is a problem that it is difficult for a single device to collect packets related to RAT propagation from the internal network without missing.

Furthermore, because the packets related to RAT propagation are only a small part of the packets that are transferred over a network, the processing load and the communication load become enormous when a method of simply collecting and checking all of the packets in a network is used. In conventional techniques, sufficient investigation has not been performed for problems such as described above.

In other words, there is no conventional art for detecting an attack by RAT properly.

Patent Document 1: Japanese Laid-open Patent Publication No. 2008-176753

Patent Document 2: International Publication Pamphlet No. WO 2007/081023

SUMMARY

A network monitoring system related to this invention includes: a first monitoring apparatus; a second monitoring apparatus; and an information processing apparatus. The first monitoring apparatus includes: a memory; and a processor configured to use the memory and execute a process. And the process includes: obtaining packets from an apparatus outside a network to a first terminal in the network, and packets from the first terminal to a second terminal in the network; and transmitting, to the information processing apparatus, information on first plural packets that are included in the obtained packets and satisfy a first condition. The second monitoring apparatus includes: a memory; and a processor configured to use the memory and execute a process. And the process includes: obtaining packets from the first terminal to the second terminal, and packets from the second terminal to the apparatus outside the network; and transmitting, to the information processing apparatus, information on second plural packets that are included in the obtained packets and satisfy a second condition. The information processing apparatus includes: a memory; and a processor configured to use the memory and execute a process. And the process includes: receiving the information on the first plural packets and the information on the second plural packets; and determining whether an attack from outside the network occurred, based on whether a same packet is included in the first plural packets and the second plural packets.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is a diagram depicting criteria for first half data;

FIG. 8 is a diagram depicting criteria for second half data;

FIG. 9 is a diagram depicting an example of data stored in a packet data storage unit;

FIG. 10 is a diagram depicting an example of completed second half data;

FIG. 12 is a diagram depicting an example of data stored in a first half data storage unit;

FIG. 16 is a diagram for explaining change of start packet;

FIG. 17 is a diagram for explaining the change of the start packet;

DESCRIPTION OF EMBODIMENTS

Embodiment 1

Figure 2:
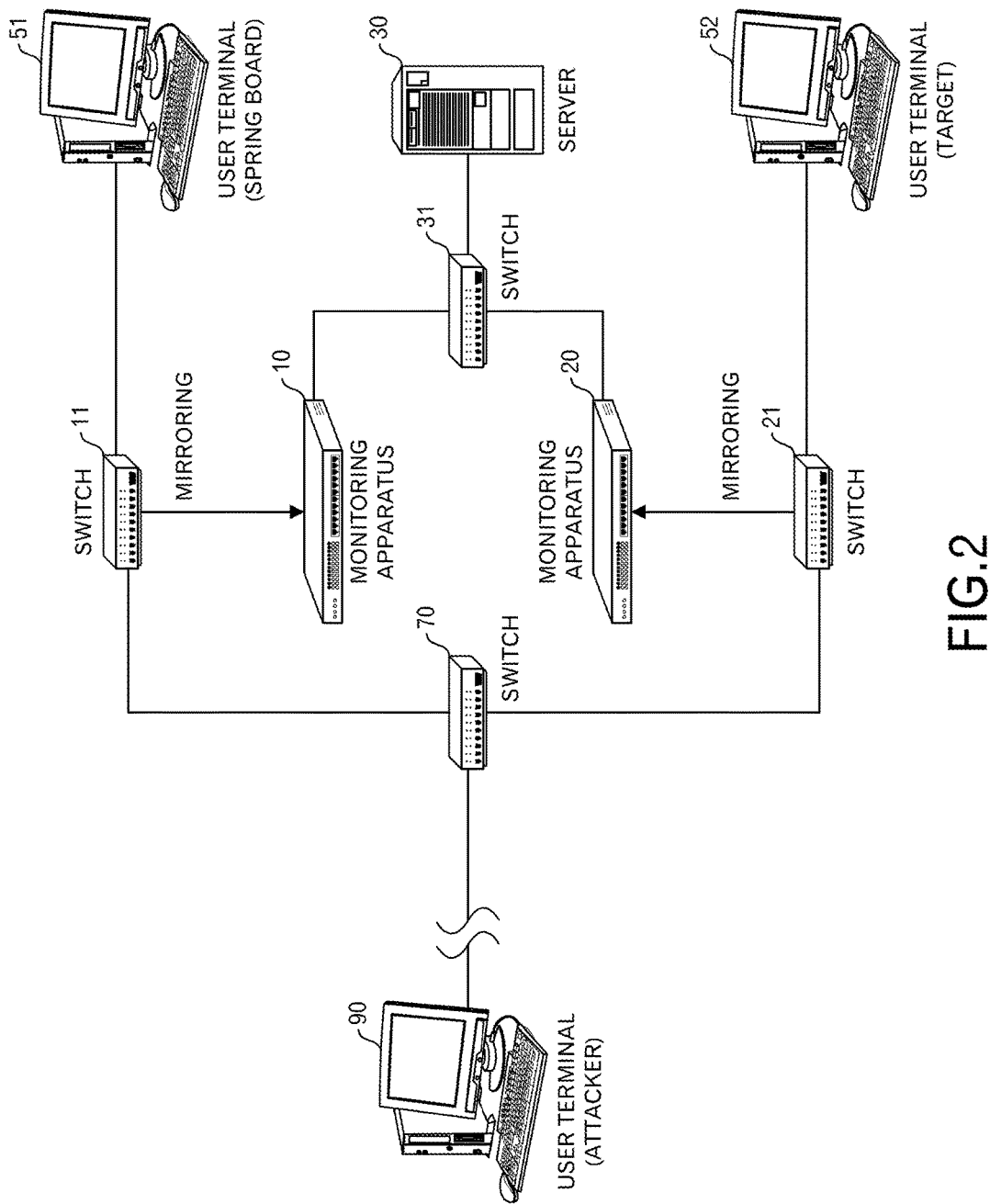
FIG. 2 is a diagram depicting a system overview of this embodiment.

FIG. 2 illustrates an overview of the system of this embodiment. A user terminal 51 and a user terminal 52 are connected to an internal network of an organization, for example, a LAN (Local Area Network). A switch 11, which is a monitoring point, is connected to the user terminal 51, so packets that are received by the user terminal 51 and packets that are transmitted by the user terminal 51 are monitored by the switch 11. Similarly, a switch 21, which is a monitoring point, is connected to the user terminal 52, so packets that are received by the user terminal 52 and packets that are transmitted by the user terminal 52 are monitored by the switch 21. The switch 11 and switch 21 are connected to a switch 70. Switch 70 is connected to a user terminal 90. However, the network between the switch 70 and the user terminal 90 may include a WAN (Wide Area Network) such as the Internet.

Figure 1:
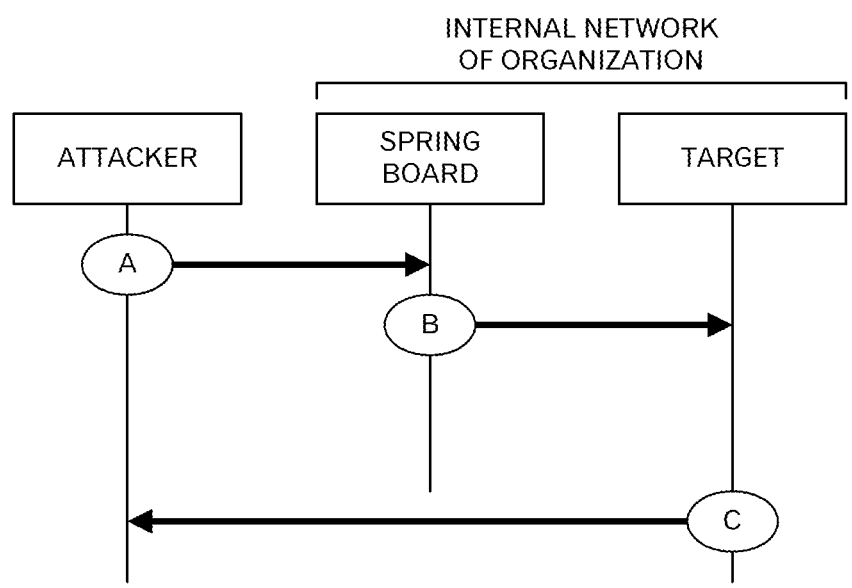
FIG. 1 is a diagram depicting an example of a targeted attack.

In FIG. 1, the user terminal 90 is an attacker's terminal, the user terminal 51 is a springboard, and the user terminal 52 is the target, however, the embodiment is not limited to this example. For example, the user terminal 51 may also be the target, and the user terminal 52 may also be the springboard. Moreover, it is not illustrated in the figures, however, another user terminal may be the springboard or the target.

A monitoring apparatus 10 obtains packets that are relayed by the switch 11 from the switch 11 by mirroring, and from the obtained packets, generates data to be transferred to a server 30. The monitoring apparatus 10 then transmits the generated data in which the destination is server 30. Similarly, a monitoring apparatus 20 obtains packets that are relayed by the switch 21 from the switch 21 by mirroring, and from the obtained packets, generates data to be transferred to a server 30. The monitoring apparatus 20 then transmits the generated data in which the destination is server 30. A switch 31 relays data received from the monitoring apparatus 10 and data received from the monitoring apparatus 20 to the server 30.

The server 30 executes processing of detecting RAT propagation based on the data received from the monitoring apparatus 10 and the data received from the monitoring apparatus 20. When RAT propagation is detected, the server 30 notifies the administrator of the internal network that the RAT propagation was detected by generating a file, transmitting mail or the like.

Figure 3:
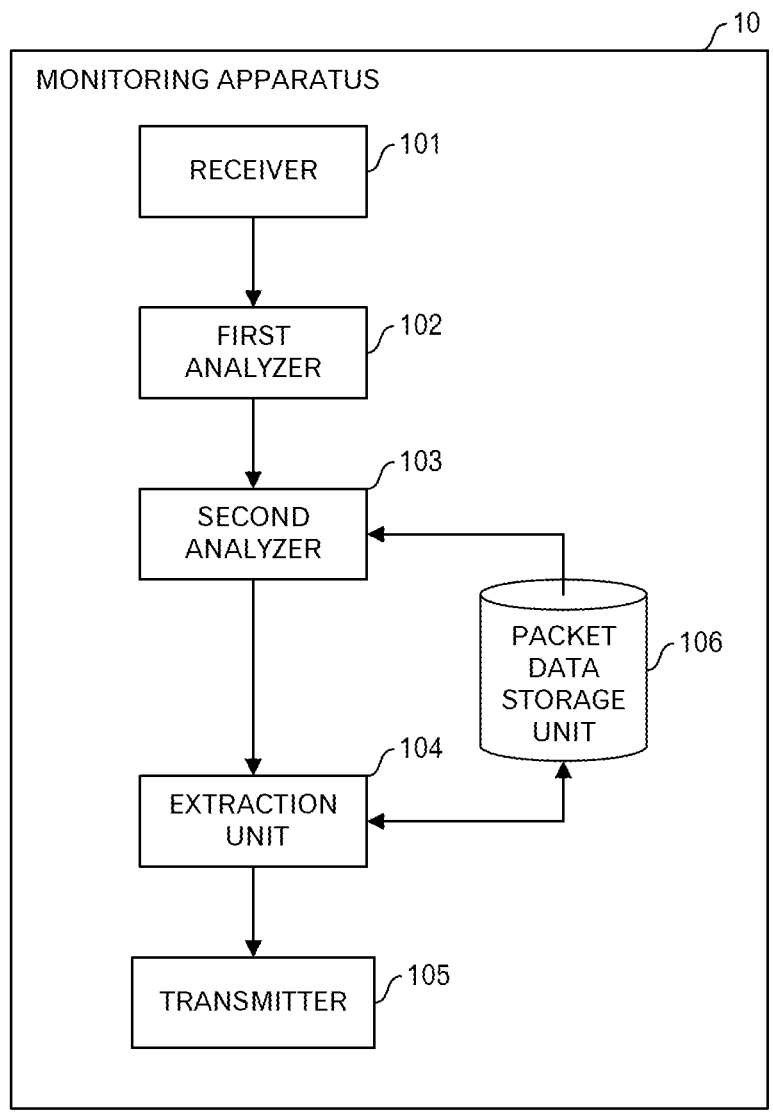
FIG. 3 is a functional block diagram of a monitoring apparatus in a first embodiment.

FIG. 3 illustrates a functional block diagram of the monitoring apparatus 10 in this first embodiment. The monitoring apparatus 10 includes a receiver 101, a first analyzer 102, a second analyzer 103, an extraction unit 104, a transmitter 105 and a packet data storage unit 106.

The receiver 101 obtains packets that are relayed by the switch 11, adds time information to the obtained packets, and outputs the packets to the first analyzer 102. The first analyzer 102 executes processing based on feature data that was extracted from packets received from the receiver 101, and outputs the feature data which is a result of the processing to the second analyzer 103. The second analyzer 103 executes processing based on the feature data received from the first analyzer 102, and data that is stored in the packet data storage unit 106, and notifies the extraction unit 104 of a result of processing. The extraction unit 104 executes processing based on the result of the processing notified by the second analyzer 103 and data that is stored in the packet data storage unit 106, and generates data to be transferred to the server 30. Then, the extraction unit 104 outputs the generated data to the transmitter 105. The transmitter 105 transmits the data received from the extraction unit 104 to the server 30.

The functional block diagram of the monitoring apparatus 20 is the same as the block diagram of the functions of the monitoring apparatus 10, so an explanation thereof is omitted.

Figure 4:
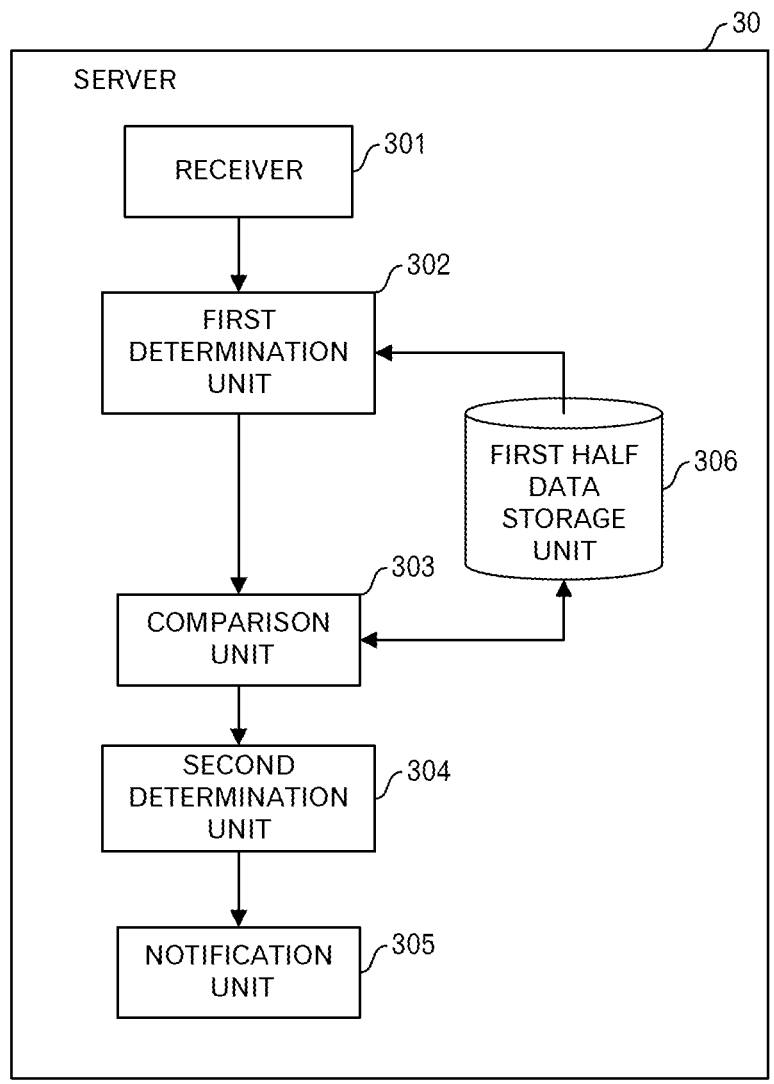
FIG. 4 is a functional block diagram of a server.

FIG. 4 illustrates a functional block diagram of the server 30. The server 30 includes a receiver 301, a first determination unit 302, a comparison unit 303, a second determination unit 304, a notification unit 305, and a first half data storage unit 306.

The receiver 301 receives data from the monitoring apparatuses 10 and 20, and outputs the data to the first determination unit 302. The first determination unit 302 stores the data received from the receiver 301 in the first half data storage unit 306, or outputs the data received from the receiver 301 to the comparison unit 303. The comparison unit 303 executes processing based on the data received from the first determination unit 302 and data that is stored in the first half data storage unit 306, and notifies a result of the processing to the second determination unit 304. The second determination unit 304 detects RAT propagation based on the processing results that were notified of by the comparison unit 303, and notifies the notification unit 305 that the RAT propagation was detected. After being notified from the second determination unit 304 that the RAT propagation was detected, the notification unit 305 notifies the administrator of the internal network of the organization that the RAT propagation was detected by file generation, mail transmission or the like.

Figure 5:
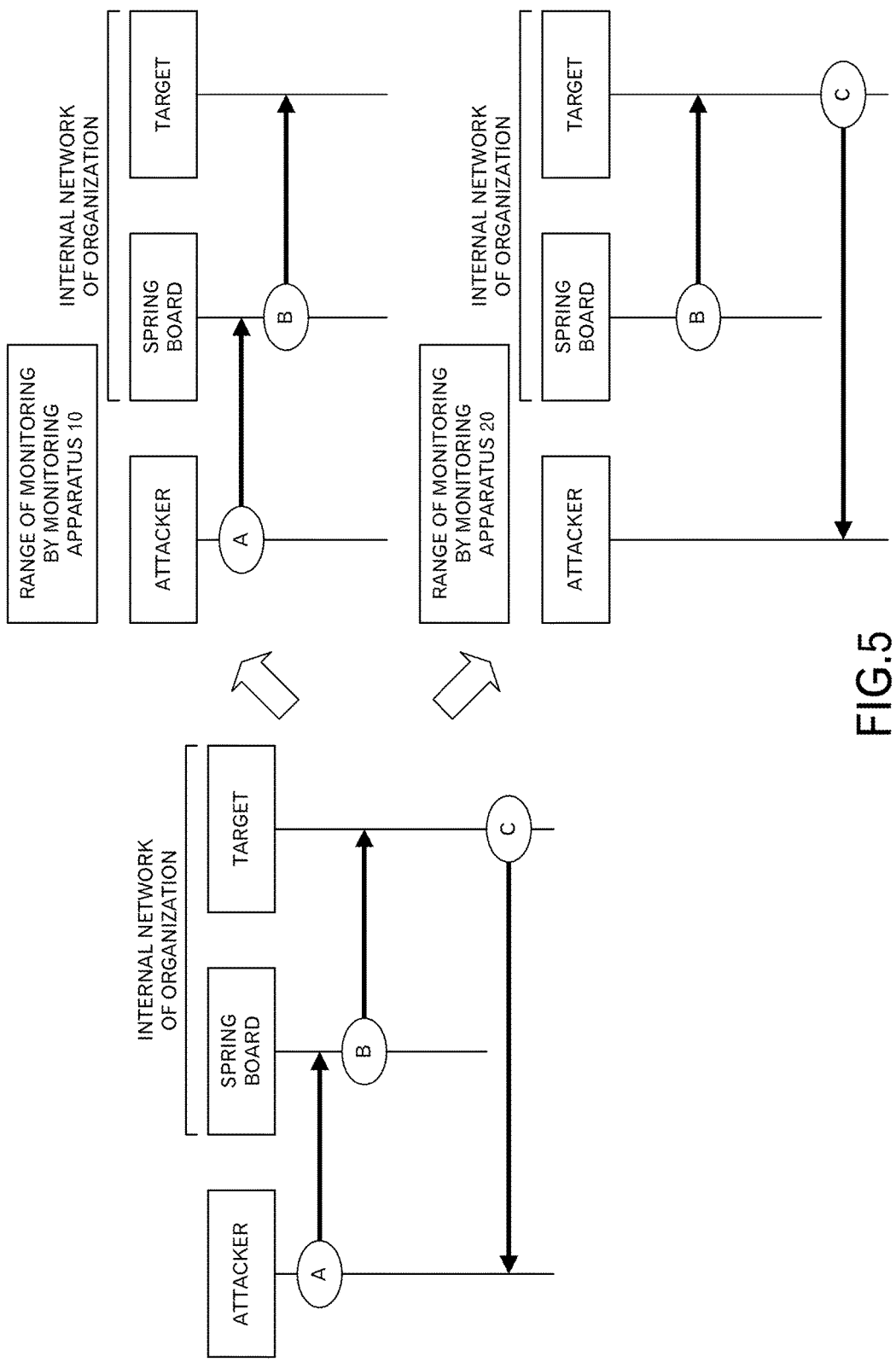
FIG. 5 is a diagram for explaining an outline of this embodiment.

An overview of this embodiment will be explained using FIG. 5. In this embodiment, RAT propagation is detected by cooperation of the monitoring apparatus 10, the monitoring apparatus 20 and the server 30 in the internal network. For example, assume that the user terminal 90 is the attacker's terminal, the user terminal 51 is the springboard, and the user terminal 52 is the target. In this case, the monitoring apparatus 10 is able to monitor packets that are received by the user terminal 51 and packets that are transmitted by the user terminal 51, so it is possible to detect that the packet A and packet B illustrated in FIG. 1 have appeared. The monitoring apparatus 20 is able to monitor packets that are received by the user terminal 52 and packets that are transmitted by the user terminal 52, so it is possible to detect that the packet B and packet C illustrated in FIG. 1 have appeared. In this way, by cooperation of plural monitoring apparatuses, it is possible to detect that packets A to C have appeared, and it is possible to handle a case in which it is difficult for a single monitoring apparatus to collect packets related to RAT propagation from the internal network.

Moreover, the monitoring apparatus 10 also transmits the information of packets A and B (hereafter, referred to as first half data) to the server 30, and the monitoring apparatus 20 transmits the information of packets B and C (hereafter, referred to as second half data) to the server 30. The server 30 determines whether a series of attack packets has appeared based on whether or not the information of packet B that is included in the first half data received from the monitoring apparatus 10 is the same as the information of packet B that is included in the second half data received from the monitoring apparatus 20. Therefore, the server 30 may process only the first half data and second half data that were sent from the monitoring apparatuses 10 and 20, and finish without processing all of the packets in the internal network. As a result, it is possible to reduce a processing load of the server 30. Moreover, it is possible to suppress communication traffic between the server 30 and the monitoring apparatuses 10 and 20.

Next, processing performed in the system of this embodiment will be explained using FIGS. 6 to 12. First, the processing that is executed by the monitoring apparatus 10 will be explained using FIGS. 6 to 10. Here, the processing that is executed by the monitoring apparatus 10 is explained, however, the processing that is executed by the monitoring apparatus 20 is the same as the processing that is executed by the monitoring apparatus 10.

First, the receiver 101 of the monitoring apparatus 10 obtains one packet from the switch 11 by mirroring (FIG. 6: step S1), and outputs the packet to the first analyzer 102.

The first analyzer 102 receives the packet from the receiver 101, extracts the feature data from the packet, and determines, based on the feature data, whether there is a possibility that the packet is an attack packet (step S3). The feature data, for example, includes a transmission source IP (Internet Protocol) address, a destination IP address, the time when a packet was obtained, a specific field value in a SMB (Server Message Block) header, a specific field value in a DCE/RPC (Distributed Computing Environment/Remote Procedure Calls) header, a TCP (Transmission Control Protocol) port number, a TCP sequence number and the like. However, not all of the information illustrated here has to be included, and it is also possible to include other information.

The determination in the step S3 is executed according to the "criteria for judgment of aggression" illustrated in FIGS. 7 and 8, for example. FIG. 7 illustrates criteria for judgment for the first half data, and FIG. 8 illustrates criteria for judgment for the second half data. In FIGS. 7 and 8, a number representing a packet type, a protocol, a role of the packet, criteria for judgment of aggression, and criteria for judgment of relationship are illustrated. A type 1 packet is a packet to the springboard from the attacker's terminal, type 2 to type 4 packets are packets from the springboard to the target, and a type 5 packet is a packet from the target to the attacker's terminal.

When there is no possibility that the packet is an attack packet (step S3: NO route), the first analyzer 102 discards the packet that was obtained in the step S1. Processing then returns to the step S1. On the other hand, when there is a possibility that the packet is an attack packet (step S3: YES route), the first analyzer 102 outputs the feature data of the packet that was obtained in the step S1 to the second analyzer 103.

The second analyzer 103 searches, based on the feature data that was received from the first analyzer 102, the packet data storage unit 106 for a packet that is related to the packet obtained in the step S1 (step S5). The search in the step S5 is executed according to the "criteria for judgment of relationship" illustrated in FIGS. 7 and 8, for example.

FIG. 9 illustrates an example of data that is stored in the packet data storage unit 106. In the example in FIG. 9, the IP address of the attacker's terminal (for example, the user terminal 90), the IP address of the springboard (for example, user terminal 51), the IP address of the target (for example, user terminal 52), a number representing the next type, information used in comparison (here, this is a TCP sequence number of the type 4 packet), and the time when each type of packet was obtained are stored. Of the entries stored in the packet data storage unit 106, entries that have not changed for a preset period of time or greater are deleted.

Figure 6:
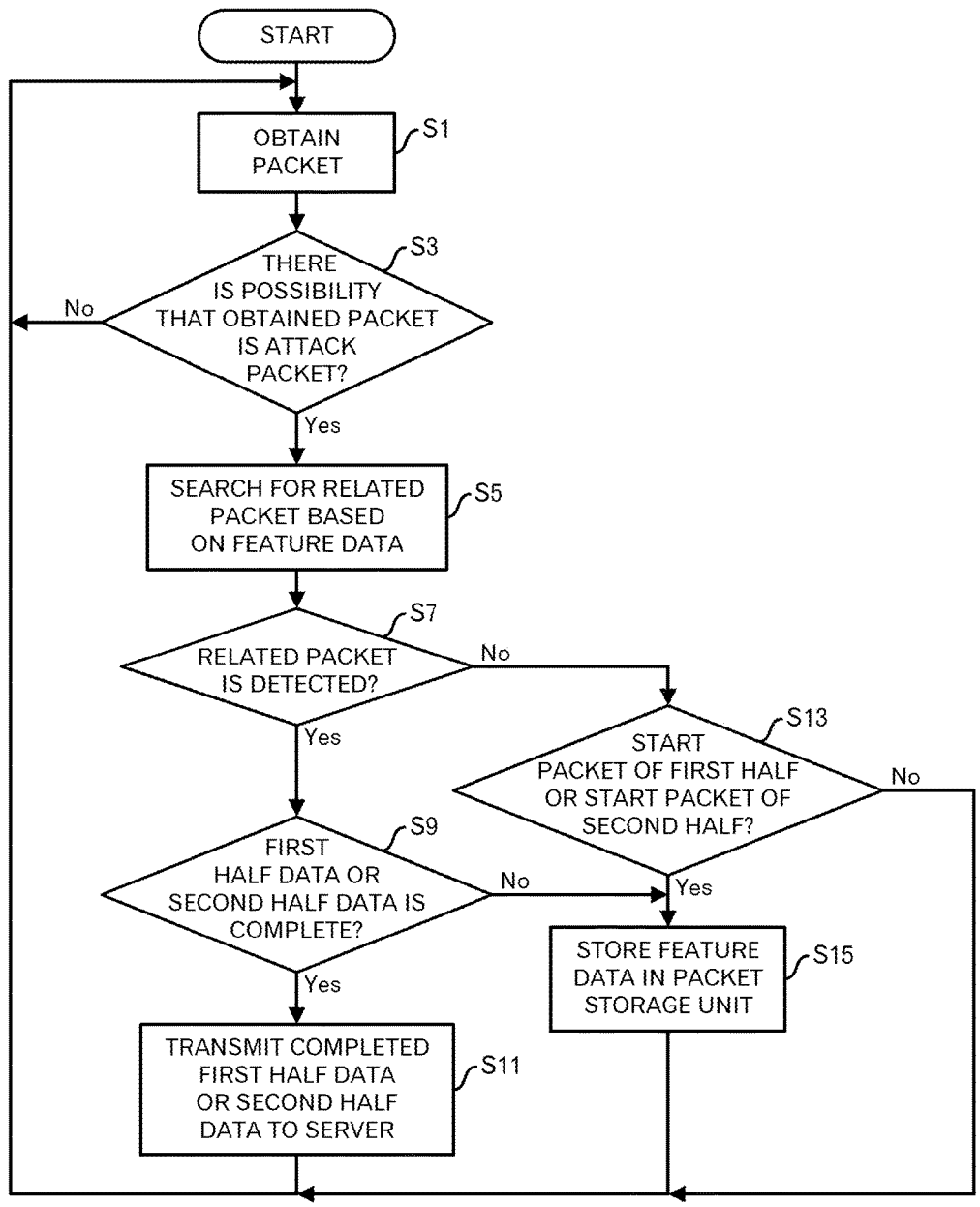
FIG. 6 is a diagram depicting a processing flow for processing executed by the monitoring apparatus in the first embodiment.

Returning to the explanation of FIG. 6, when there is a related packet (step S7: YES route), the second analyzer 103 determines whether the first half data or second half data is complete (step S9). The first half data is complete when there are type 1 to type 4 packets, and the second half data is complete when there are type 2 to type 5 packets. Therefore, when the packet obtained in the step S1 is a type 4 packet and there are type 1 to type 4 packets, the first half data is complete. Moreover, when the packet obtained in the step S1 is a type 5 packet and there are type 2 to type 5 packets, the second half data is complete.

When the first half data or the second half data is not complete (step S9: NO route), the second analyzer 103 outputs the feature data to the extraction unit 104. The extraction unit 104 then stores the feature data that was received from the second analyzer 103 in the packet data storage unit 106 (step S15). Processing then returns to the step S1. Here, the time when the packet was obtained, IP address and the like are added to an existing entry. The extraction unit 104 then increments the number that represents the next type by 1.

When the first half data or second half data is complete (step S9: YES route), the second analyzer 103 outputs the feature data to the extraction unit 104. The extraction unit 104 then outputs the first half data or second half data that includes the feature data of the packet obtained in the step S1, and feature data of packets related to that packet to the transmitter 105. The extraction unit 104 then deletes the entry for the completed first half data or second half data from the packet data storage unit 106.

FIG. 10 illustrates an example of completed second half data. In the example in FIG. 10, the second half data includes the IP address of the attacker's terminal, the IP address of the springboard, the IP address of the target, information to be used in comparison, and the time when each type of packet was obtained. The first half data has the same format, however, in the case of the first half data, the time when the type 1 to type 4 packets were obtained is included.

Returning to the explanation of FIG. 6, the transmitter 105 transmits the first half data or second half data that was received from the extraction unit 104 to the server 30 (step S11). Processing then returns to the step S1.

On the other hand, when it is determined in the step S7 that there are no related packets (step S7: NO route), the second analyzer 103 determines whether the packet obtained in the step S1 is the start packet of the first half, or the start packet of the second half (step S13). In this embodiment, the start packet of the first half is a type 1 packet, and the start packet of the second half is a type 2 packet.

When the obtained packet is not the start packet of the first half, or the start packet of the second half (step S13: NO route), processing returns to the step S1. However, when the obtained packet is the start packet of the first half, or the start packet of the second half (step S13: YES route), the second analyzer 103 outputs the feature data to the extraction unit 104. The extraction unit 104 then newly stores an entry for the packet that was obtained in the step S1 in the packet data storage unit 106 (step S15). Processing then returns to the step S1.

For example, when the packet is the start packet of the first half, the extraction unit 104 stores the IP address of the attacker's terminal, the IP address of the springboard, and the time when the type 1 packet was obtained, and sets the number representing the next type to "2". Moreover, when the packet is the start packet of the second half, the extraction unit 104 stores the IP address of the springboard, the IP address of the attacker's terminal, and the time when the type 2 packet was obtained, and sets the number representing the next type to "3".

By executing the processing described above, communication with the server 30 occurs only when the first half data or second half data is complete. As a result, it becomes possible to reduce the traffic between the server 30 and the monitoring apparatuses 10 and 20.

Next, processing that is executed by the server 30 will be explained using FIGS. 11 and 12.

First, the receiver 301 of the server 30 receives first half data or second half data from the monitoring apparatus 10 or 20 (FIG. 11: step S21), and outputs the data to the first determination unit 302.

The first determination unit 302 determines whether or not the data received in the step S21 is first half data (step S23). For example, when feature data of a type 1 packet is included in the received data, the received data is first half data. Moreover, when feature data of a type 5 packet is not included in the received data, the received data is first half data.

When the received data is first half data (step S25: YES route), the first determination unit 302 stores the received first half data in the first half data storage unit 306 (step S27). Processing then returns to the step S21.

FIG. 12 illustrates an example of data that is stored in the first half data storage unit 306. In the example in FIG. 12, the IP address of the attacker's terminal, the IP address of the springboard, the IP address of the target, information to be used in comparison (here, this is the TCP sequence number of the type 4 packet), and the time when each type of packet was obtained are stored. Of the entries stored in the first half data storage unit 306, entries that have not changed for a preset period of time or longer are deleted.

Figure 11:
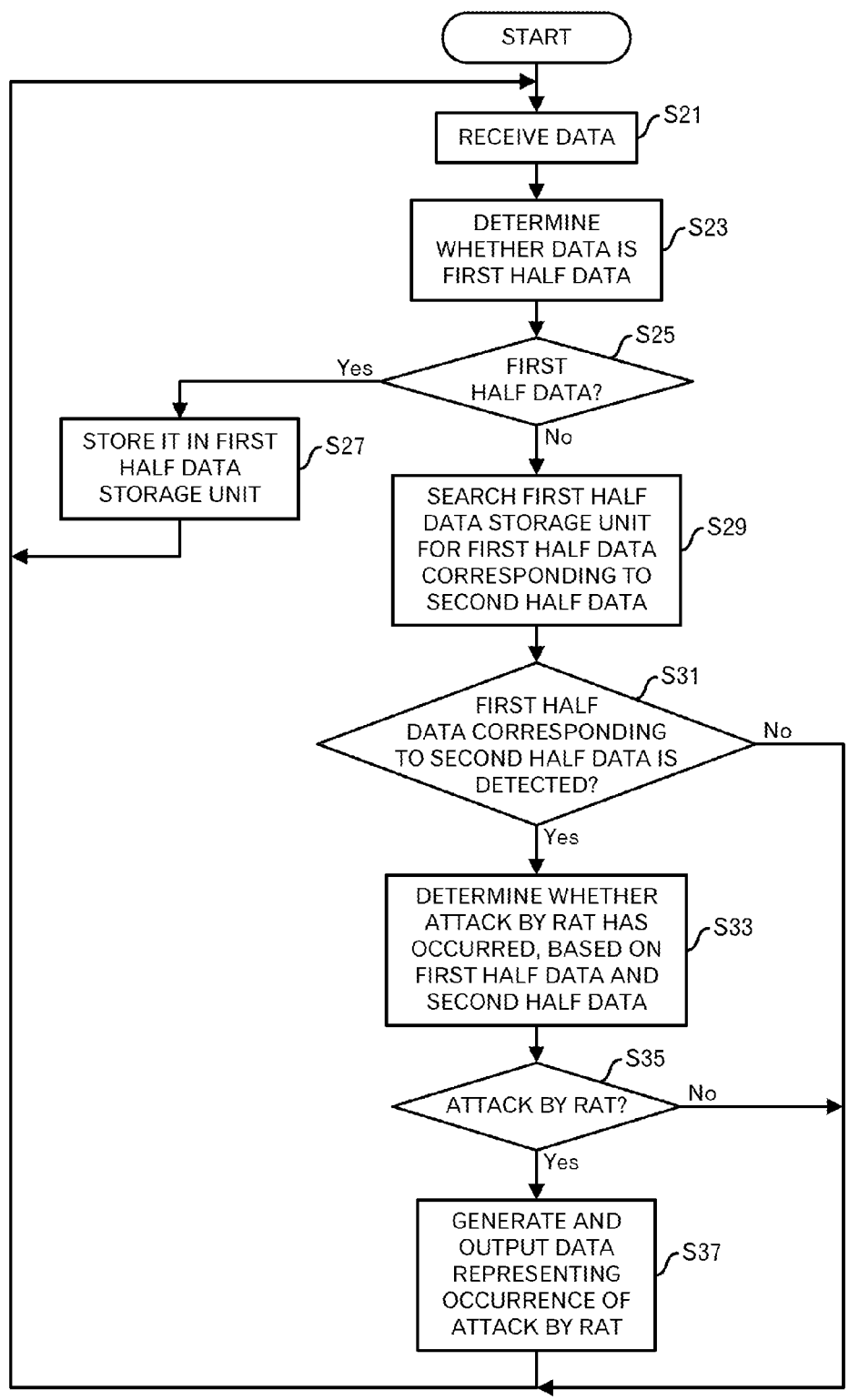
FIG. 11 is a diagram depicting an example of processing executed by the server.

Returning to the explanation of FIG. 11, when it is determined in the step S25 that the received data is not first half data (in other words, is second half data) (step S25: NO route), the first determination unit 302 outputs the second half data to the comparison unit 303. Accordingly, the comparison unit 303 searches the first half data storage unit 306 for first half data that corresponds to the second half data (step S29). In the step S29, first half data that includes feature data that is the same as the feature data that is included in the second half data is searched for. In this embodiment, the TCP sequence number of the type 4 packet is used as the feature data. However, it is also possible to use feature data of type 2 or type 3. Moreover, it is also possible to use the IP address of the transmission source, the IP address of the destination, the TCP port number of the transmission source, the TCP port number of the destination, the multiplex ID in the SMB header, or the command sequence number in the SMB header instead of the TCP sequence number, or it is possible to use a combination of these.

The comparison unit 303 determines whether there is first half data that corresponds to the second half data (step S31). When there is no first half data that corresponds to the second half data (step S31: NO route), processing returns to the step S21.

When there is first half data that corresponds to the second half data (step S31: YES route), the comparison unit 303 outputs the second half data and the first half data to the second determination unit 304. Accordingly, the second determination unit 304 determines, based on the first half data and second half data, whether or not there is an RAT attack (step S33). For example, when the IP address of the transmission source matches the IP address of a white list that was defined beforehand, it is determined that there is no RAT attack. Moreover, for example, when the difference between the time when the type 1 packet was obtained and the time the type 5 packet was obtained is longer than a predetermined period of time, it is determined that there is no RAT attack.

When it is determined that there is no RAT attack (step S35: NO route), processing returns to the step S21. When it is determined that there is an RAT attack (step S35: YES route), the second determination unit 304 outputs the first half data and the second half data to the notification unit 305.

The notification unit 305 generates and outputs, based on the second half data and the first half data, data that represents that an RAT attack occurred (step S37). In the step S37, for example, data is displayed on a display device of the server 30, or data for an e-mail is generated and that e-mail is transmitted. Processing then returns to the step S21.

By executing the processing described above, it is possible to detect an RAT attack properly even when two monitoring apparatuses collect packets. Moreover, the server 30 has to process only the received first half data and second half data, and does not need to individually process the packets that are transferred over the internal network, so the processing load of the server 30 is reduced.

Embodiment 2

In a second embodiment, a method for reducing the processing load of the monitoring apparatuses 10 and 20 will be explained.

Figures 13, 15:
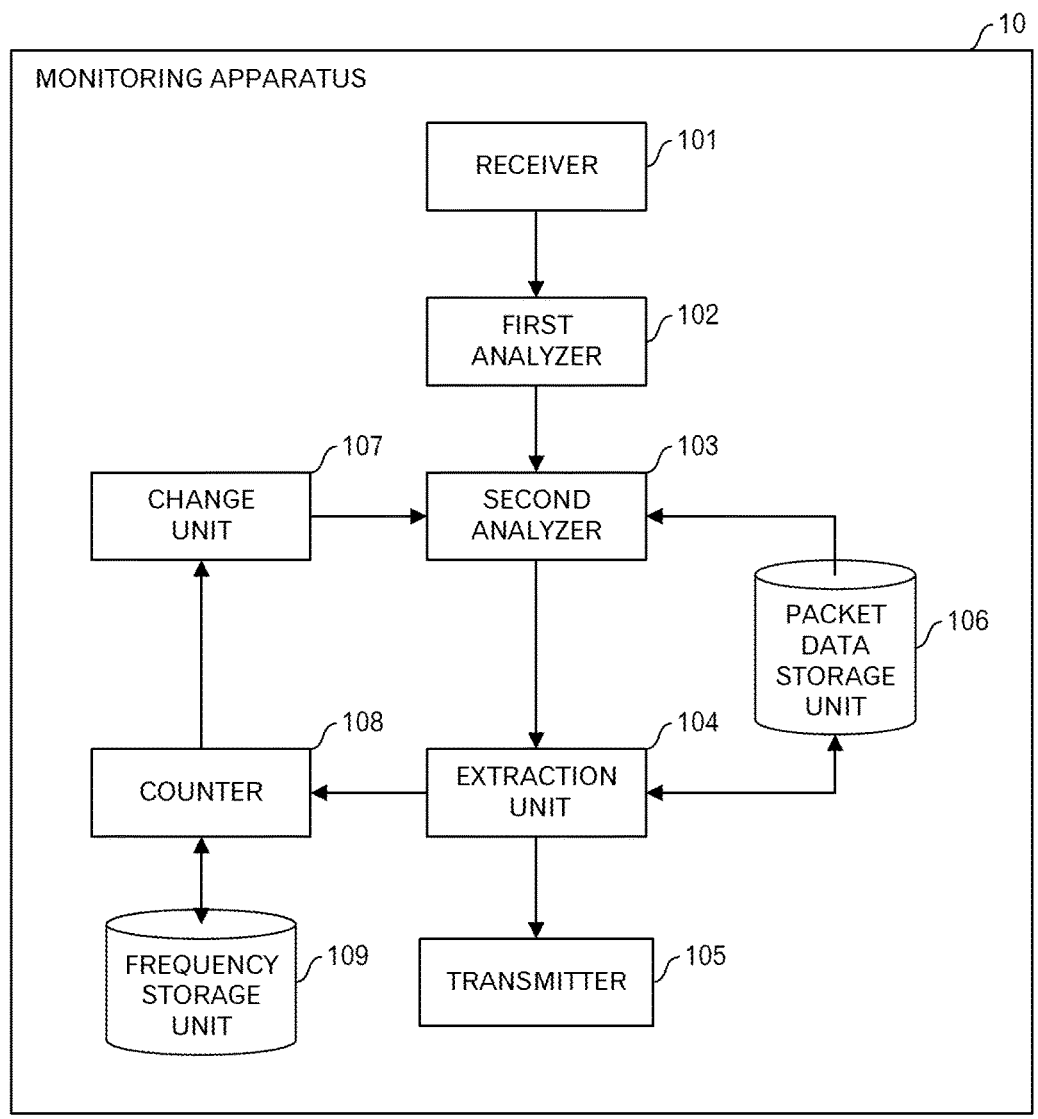
FIG. 13 is a functional block diagram of the monitoring apparatus in a second embodiment.
FIG. 15 is a diagram depicting an example of data stored in a frequency storage unit.

The monitoring apparatuses 10 and 20 in this second embodiment differ from the monitoring apparatuses 10 and 20 in the first embodiment. FIG. 13 illustrates a block diagram of the functions of the monitoring apparatus 10 in this second embodiment. The monitoring apparatus 10 includes a receiver 101, a first analyzer 102, a second analyzer 103, an extraction unit 104, a transmitter 105, a packet data storage unit 106, a change unit 107, a counter 108 and a frequency storage unit 109.

The receiver 101 obtains a packet that is relayed by a switch 11, attaches information of the time when the packet was obtained to the packet and outputs the packet to the first analyzer 102. The first analyzer 102 executes processing based on feature data that is extracted from the packet received from the receiver 101, and outputs the feature data that is a result of the processing to the second analyzer 103. The second analyzer 103 executes processing based on the feature data that was received from the first analyzer 102 and data that is stored in the packet data storage unit 106, and notifies the extraction unit 104 of a result of the processing. The extraction unit 104 executes processing based on the result of the processing notified from the second analyzer 103 and data that is stored in the packet data storage unit 106, and outputs first half data and second half data that will be described later to the transmitter 105. The transmitter 105 transmits the first half data and second half data that were received from the extraction unit 104 to a server 30. The counter 108 counts the number of packets for each type, and based on a result of counting, updates the frequency storage unit 109. The change unit 107 outputs a designation of the start packet to the second analyzer 103 in response to a notification from the counter 108.

The functional block diagram of the monitoring apparatus 20 is the same as the functional block diagram of the monitoring apparatus 10, so an explanation thereof is omitted.

Next, processing that is executed by the monitoring apparatus 10 in this second embodiment will be explained using FIG. 14 to FIG. 18. Here, the processing that is executed by the monitoring apparatus 10 will be explained, however, processing that is executed by the monitoring apparatus 20 is the same as the processing that is executed by the monitoring apparatus 10.

First, the receiver 101 of the monitoring apparatus 10 obtains one packet from the switch 11 by mirroring (FIG. 14: step S41), and outputs the packet to the first analyzer 102.

The first analyzer 102 receives the packet from the receiver 101 and extracts feature data from the packet, then based on the feature data, determines whether there is a possibility that the packet is an attack packet (step S43). The feature data, for example, includes a transmission source IP address, a destination IP address, the time when a packet was obtained, a specific field value in a SMB header, a specific field value in a DCE/RPC header, a TCP port number, a TCP sequence number and the like. However, not all of the information illustrated here has to be included, and it is also possible to include other information.

The determination in the step S43 is executed according to the "criteria for judgment of aggression" illustrated in FIGS. 7 and 8, for example. When there is no possibility that the packet is an attack packet (step S43: NO route), the first analyzer 102 discards the packet that was obtained in the step S41. Processing then returns to the step S41. On the other hand, when there is a possibility that the packet is an attack packet (step S43: YES route), the first analyzer 102 outputs the feature data of the packet obtained in the step S41 to the second analyzer 103.

The second analyzer 103 searches, based on the feature data received from the first analyzer 102, the packet data storage unit 106 for packets related to the packet obtained in the step S41 (step S45). The search in the step S45 is executed according to the "criteria for judgment of relationship" illustrated in FIGS. 7 and 8, for example.

When there is a related packet (step S47: YES route), the second analyzer 103 determines whether the first half data or second half data is complete (step S49). The first half data is complete when type 1 to type 4 packets have been collected, and the second half data is complete when type 2 to type 5 packets have been collected. Therefore, when the packet that was obtained in the step S41 is a type 4 packet, and type 1 to type 4 packets have been collected, the first half data is complete. Moreover, when the packet that was obtained in the step S41 is a type 5 packet, and type 2 to type 5 packets have been collected, the second half data is complete.

When the first half data or the second half data is not complete (step S49: NO route), the second analyzer 103 outputs the feature data to the extraction unit 104. The extraction unit 104 then stores the feature data that was extracted in the step S43 in the packet data storage unit 106 (step S55). Here, the time when the packet was obtained, an IP address and the like are added to an existing entry. The extraction unit 104 then increments the number that represents the next type by 1.

When the first half data or second half data is complete (step S49: YES route), the second analyzer 103 outputs the feature data to the extraction unit 104. The extraction unit 104 then outputs the first half data or second half data that includes the feature data of the packet that was obtained in the step S41, and the feature data of packets related to that packet to the transmitter 105. The extraction unit 104 then deletes the entry for the completed first half data or second half data from the packet data storage unit 106.

The transmitter 105 transmits the first half data or second half data that was received from the extraction unit 104 to the server 30 (step S51). Processing then returns to the step S41.

On the other hand, when it is determined in the step S47 that there is no related packet (step S47: NO route), the second analyzer 103 determines whether the packet obtained in the step S41 is the start packet of the first half, or the start packet of the second half (step S53). In this embodiment, the start packet of the first half is a type 1 packet, and the start packet of the second half is a packet having the type designated by the change unit 107.

When the obtained packet is not the start packet of the first half or the start packet of the second half (step S53: NO route), processing shifts to step S57. However, when the obtained packet is the start packet of the first half, or the start packet of the second half (step S53: YES route), the second analyzer 103 outputs the feature data to the extraction unit 104. The extraction unit 104 then stores a new entry for the packet obtained in the step S41 in the packet data storage unit 106 (step S55).

The second analyzer 103 determines whether the packet obtained in the step S41 is a packet of the second half packets, which is common with a packet of the first half (step S57). In the example in FIG. 8, packets of the second half packets, which are common with packets of the first half packets, are type 2 to type 4 packets.

When the obtained packet is not a packet of the second half packets, which is common with a packet of the first half packets (step S57: NO route), processing returns to the step S41. On the other hand, when the obtained packet is a packet of the second half packets, which is common with a packet of the first half packets (step S57: YES route), the second analyzer 103 outputs a frequency update instruction to the counter 108. In accordance with this, the counter 108 updates the frequency stored in the frequency storage unit 109 for the type of the packet obtained in the step S41 (step S59).

FIG. 15 illustrates an example of data that is stored in the frequency storage unit 109. In the example in FIG. 15, frequency information is stored for each of the packets of the second half packets, which are common with packets of the first half packets (here, type 2 to type 4 packets). The frequency is the number of obtained packets per second, for example.

Figure 14:
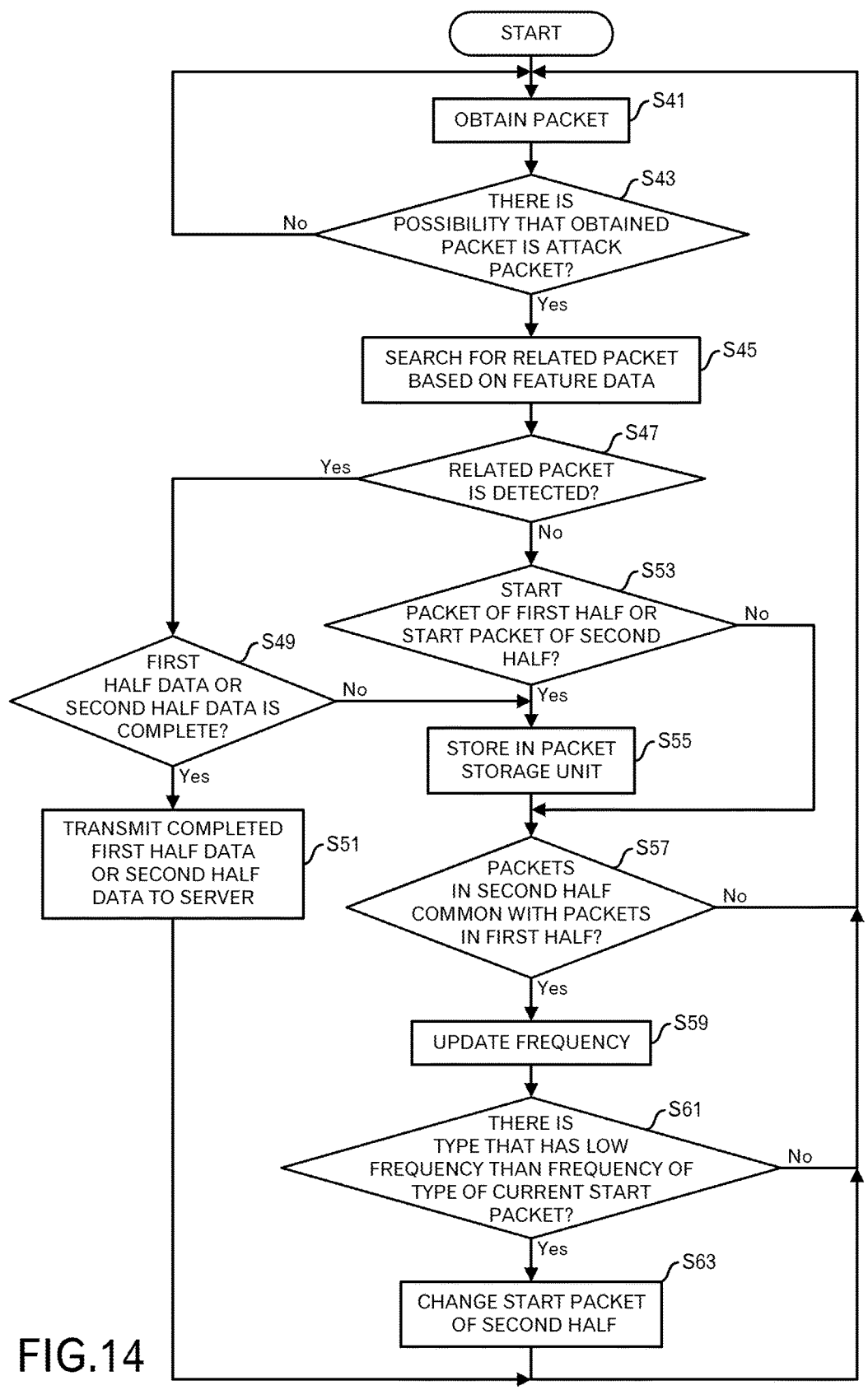
FIG. 14 is a diagram depicting a processing flow for processing executed by the monitoring apparatus in the second embodiment.
Figure 18:
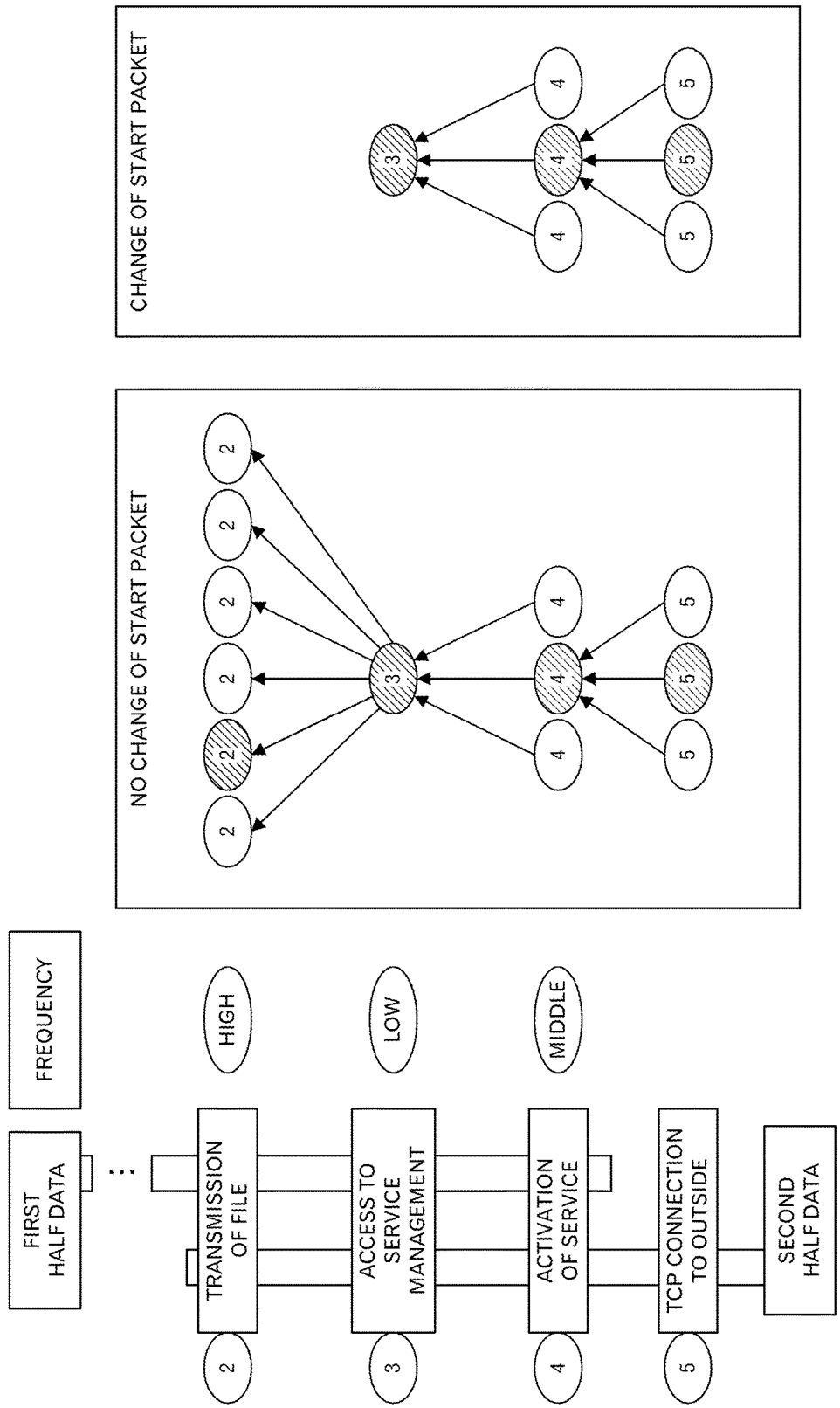
FIG. 18 is a diagram for explaining decrement of a processing load by the change of the start packet.

Returning to the explanation of FIG. 14, the counter 108 determines whether there is a packet type that has a lower frequency than the frequency of the type of the current start packet (step S61). When there is no packet type that has a frequency lower than the frequency of the type of the current start packet (step S61: NO route), the start packet does not need to be changed, so processing returns to the step S41. However, when there is a packet type that has a frequency lower than the frequency of the type of the current start packet (step S61: YES route), the counter 108 notifies the change unit 107 of the packet type having the lowest frequency. Accordingly, the change unit 107 changes the start packet of the second half (step S63). More specifically, the change unit 107 outputs a designation of the start packet of the second half to the second analyzer 103. Processing then returns to the step S41.

Changing the start packet will be explained in more detail using FIGS. 16 and 17. In the example in FIG. 16, the frequency for type 2 is 80 packets per second, the frequency for type 3 is 12 packets per second, and the frequency for type 4 is 20 packets per second. In this case, the type 3 packet is the start packet. The type 2 packet is extracted only in the first half, and not extracted in the second half. Therefore, the type 2 packet is not used in the processing by the comparison unit 303 in the step S29. There is a possibility that the type 3 and type 4 packets will be used for comparison.

In the example in FIG. 17, the frequency for type 2 is 80 packets per second, the frequency for type 3 is 20 packets per second, and the frequency for type 4 is 1 packet per second. In this case, the type 4 packet is the start packet. The type 2 and type 3 packets are extracted only in the first half, and are not extracted in the second half. Therefore, the type 2 and type 3 packets are not used in the processing by the comparison unit 303 in the step S29. Only the information of the type 4 packet will be used in the processing by the comparison unit 303.

By executing processing such as described above, it is possible to reduce the processing load on the monitoring apparatuses 10 and 20. Reducing the processing load by changing the start packet will be explained using FIG. 18. In the example in FIG. 18, the frequency is found for type 2 packets, type 3 packets and type 4 packets that are packets in the second half and are common with the packets in the first half. Here, the frequency of type 2 is the highest, the frequency of type 3 is the lowest, and the frequency of type 4 is lower than the frequency of type 2 and higher than the frequency of type 3. In this kind of situation, by setting a type 2 packet to be the start packet for the second half, the load of the processing for searching for a type 2 packet that is related to a type 3 packet increases. In the example in FIG. 18, the relationship is checked for six type 2 packets. On the other hand, when the start packet for the second half is set to the type 3 packet, there is no need to perform processing to search for the type 2 packet that is related to the type 3 packet.

In this second embodiment, there is a possibility that the start packet will be changed, so the information that is used for comparison is preferably feature data of a type 4 packet that is obtained regardless of the start packet. In the first embodiment, the start packet is not changed, so it is possible to use feature data of any of type 2 to type 4 for comparison.

Although the embodiments of this invention were explained above, this invention is not limited to those. For example, the functional block configurations of the monitoring apparatuses 10 and 20 and the server 30, which are explained above, do not always correspond to actual program module configurations.

Moreover, the configurations of the respective data storages are mere example, and may be changed. Furthermore, as for the processing flow, as long as the processing results do not change, the turns of the steps may be exchanged or the steps may be executed in parallel.

For example, it is also possible for a relay apparatus (for example a router, switch, firewall, or the like) that relays packets in an internal network to have the functions of the monitoring apparatuses 10 and 20.

Moreover, the network between the monitoring apparatuses 10 and 20 and the server 30 can be the same network that is related to an attack, or can be a network for another use. The form of the internal network is not limited to the form illustrated in FIG. 2.

It is also possible to set the start packet based on the frequency during a test operation that was performed beforehand, or it is also possible for the administrator to designate the start packet.

Figure 19:
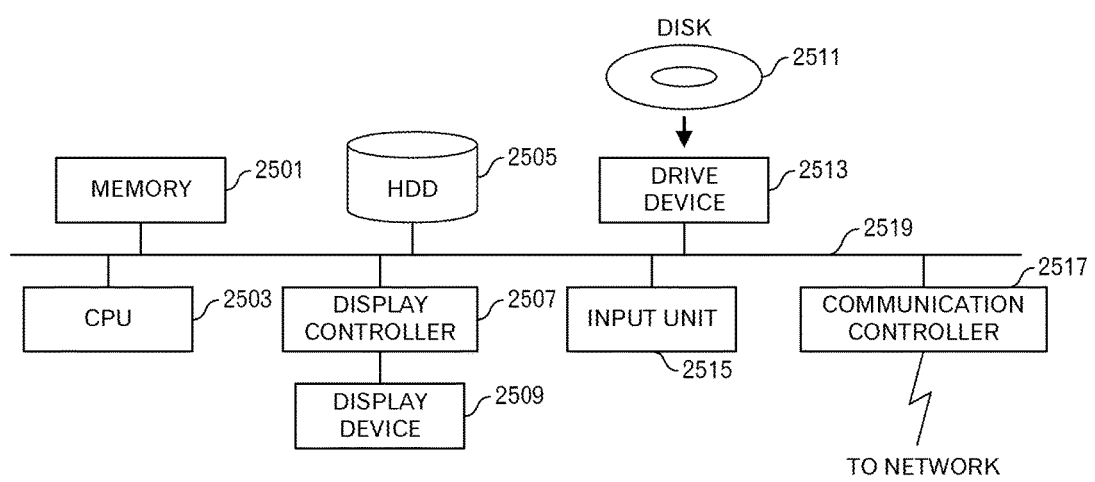
FIG. 19 is a functional block diagram of a computer.

In addition, the aforementioned the monitoring apparatuses 10 and 20 and the server 30 are computer devices as illustrated in FIG. 19. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 19. An operating system (OS) and an application program for carrying out the foregoing processing in the embodiment, are stored in the HDD 2505, and when executed by the CPU 2503, they are readout from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned processing is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments are summarized as follows:

A network monitoring system relating to a first aspect of this embodiment includes: (A) a first monitoring apparatus; (B) a second monitoring apparatus; and (C) an information processing apparatus. The first monitoring apparatus includes: a memory; and a processor configured to use the memory and execute a process. And the process includes: (a1) obtaining packets from an apparatus outside a network to a first terminal in the network, and packets from the first terminal to a second terminal in the network; and (a2) transmitting, to the information processing apparatus, information on first plural packets that are included in the obtained packets and satisfy a first condition. The second monitoring apparatus includes: a memory; and a processor configured to use the memory and execute a process. And the process includes: (b1) obtaining packets from the first terminal to the second terminal, and packets from the second terminal to the apparatus outside the network; and (b2) transmitting, to the information processing apparatus, information on second plural packets that are included in the obtained packets and satisfy a second condition. The information processing apparatus includes: a memory; and a processor configured to use the memory and execute a process. And the process includes: (c1) receiving the information on the first plural packets and the information on the second plural packets; and (c2) determining whether an attack from outside the network occurred, based on whether a same packet is included in the first plural packets and the second plural packets.

By performing processing as described above, it becomes possible to detect an attack by RAT without increasing a processing load of the information processing apparatus and increasing a communication load between the information processing apparatus and the monitoring apparatus.

Moreover, the second monitoring apparatus may include: (b3) counting a number of packets for each type of packets from the first terminal to the second terminal; and (b3) determining, based on the counted numbers, packets to be monitored by the second monitoring apparatus from among packets to the second terminal. By performing processing as described above, it becomes possible to decrease a processing load of the second monitoring apparatus because packets can be removed from targets of monitoring when, for example, the number of packets is enormous.

Moreover, the first and second condition may include a condition that a header of a packet from the first terminal to the second terminal includes predetermined information. By performing processing as described above, it becomes possible to identify packets related to the attack.

Moreover, the first condition may include a condition that a time period between a time when a packet from the apparatus outside the network to the first terminal was obtained and a time when a packet from the first terminal to the second terminal is equal to or shorter than a first time period. And the second condition may include a condition that a time period between a time when a packet from the first terminal to the second terminal was obtained and a time when a packet from the second terminal to the apparatus outside the network is equal to or shorter than a second time period. It is considered that plural packets that relate to the same attack appear comparatively in a short period of time. Therefore, by performing processing as described above, it becomes possible to remove packets that do not relate to the attack.

Moreover, the information on the first plural packets and the information on the second plural packets may include at least one of an IP (Internet Protocol) address, a TCP (Transmission Control Protocol) port number, a TCP sequence number, a multiplex ID (IDentifier) in a SMB (Server Message Block) header, and a command sequence number in the SMB header. As a result, it becomes possible to determine whether the same packet is or not properly.

A network monitoring system relating to a second aspect of this embodiment includes: (D) a first monitoring apparatus; (E) a second monitoring apparatus; and (F) an information processing apparatus. The first monitoring apparatus includes circuitry or a processor programmed to: (d1) obtain packets from an apparatus outside a network to a first terminal in the network, and packets from the first terminal to a second terminal in the network; and (d2) transmit, to the information processing apparatus, information on first plural packets that are included in the obtained packets and satisfy a first condition. The second monitoring apparatus includes circuitry or a processor programmed to: (e1) obtain packets from the first terminal to the second terminal, and packets from the second terminal to the apparatus outside the network; and (e2) transmit, to the information processing apparatus, information on second plural packets that are included in the obtained packets and satisfy a second condition. The information processing apparatus includes circuitry or a processor programmed to: (f1) receive the information on the first plural packets and the information on the second plural packets; and (f2) determine whether an attack from outside the network occurred, based on whether a same packet is included in the first plural packets and the second plural packets.

A network monitoring method relating to a third aspect of this embodiment, which is executed in a network monitoring system that includes a first monitoring apparatus, a second monitoring apparatus and an information processing apparatus, includes: (G) obtaining, by the first monitoring apparatus, packets from an apparatus outside a network to a first terminal in the network, and packets from the first terminal to a second terminal in the network; (H) transmitting, by the first monitoring apparatus and to the information processing apparatus, information on first plural packets that are included in the obtained packets and satisfy a first condition; (I) obtaining, by the second monitoring apparatus, packets from the first terminal to the second terminal, and packets from the second terminal to the apparatus outside the network; (J) transmitting, by the second monitoring apparatus and to the information processing apparatus, information on second plural packets that are included in the obtained packets and satisfy a second condition; (K) receiving, by the information processing apparatus, the information on the first plural packets and the information on the second plural packets; and (L) determining, by the information processing apparatus, whether an attack from outside the network occurred, based on whether a same packet is included in the first plural packets and the second plural packets.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. A network monitoring system, comprising:
a first monitoring apparatus;
a second monitoring apparatus; and
an information processing apparatus, and
the first monitoring apparatus including:
a first memory; and
a first processor coupled to the first memory and configured to:
obtain packets from an apparatus outside a network to a first terminal in the network, and packets from the first terminal to a second terminal in the network; and
transmit, to the information processing apparatus, information on a first plurality of packets that are included in the obtained packets and satisfy a first condition, the second monitoring apparatus comprises:
a second memory; and
a second processor coupled to the second memory and configured to:
obtain packets from the first terminal to the second terminal, and packets from the second terminal to the apparatus outside the network;
transmit, to the information processing apparatus, information on a second plurality of packets that are included in the obtained packets and satisfy a second condition, count a number of packets for each type of packets from the first terminal to the second terminal; and
determine, based on the counted numbers, packets to be monitored by the second monitoring apparatus from among packets to the second terminal, and the information processing apparatus comprises:
a third memory; and
a third processor coupled to the third memory and configured to:
receive the information on the first plurality of packets and the information on the second plurality of packets; and
determine whether an attack from an outside of the network occurred, based on whether a same packet is included in the first plurality of packets and the second plurality of packets.

2. The network monitoring system as set forth in claim 1, wherein the first and second condition include a condition that a header of a packet from the first terminal to the second terminal includes predetermined information.

3. The network monitoring system as set forth in claim 1, wherein the first condition includes a condition that a time period between a time when a packet from the apparatus outside the network to the first terminal was obtained and a time when a packet from the first terminal to the second terminal was obtained is equal to or shorter than a first time period, and
the second condition includes a condition that a time period between a time when a packet from the first terminal to the second terminal was obtained and a time when a packet from the second terminal to the apparatus outside the network was obtained is equal to or shorter than a second time period.

4. The network monitoring system as set forth in claim 1, wherein the information on the first plurality of packets and the information on the second plurality of packets include at least one of an IP (Internet Protocol) address, a TCP (Transmission Control Protocol) port number, a TCP sequence number, a multiplex ID (IDentifier) in a SMB (Server Message Block) header, and a command sequence number in the SMB header.

5. A network monitoring method executed in a network monitoring system that includes a first monitoring apparatus, a second monitoring apparatus, and an information processing apparatus, comprising:
obtaining, by the first monitoring apparatus, packets from an apparatus outside a network to a first terminal in the network, and packets from the first terminal to a second terminal in the network;
transmitting, by the first monitoring apparatus and to the information processing apparatus, information on a first plurality of packets that are included in the obtained packets and satisfy a first condition;
obtaining, by the second monitoring apparatus, packets from the first terminal to the second terminal, and packets from the second terminal to the apparatus outside the network;
transmitting, by the second monitoring apparatus and to the information processing apparatus, information on a second plurality of packets that are included in the obtained packets and satisfy a second condition;
receiving, by the information processing apparatus, the information on the first plurality of packets and the information on the second plurality of packets;
determining, by the information processing apparatus, whether an attack from an outside of the network occurred, based on whether a same packet is included in the first plurality of packets and the second plurality of packets;
counting, by the second monitoring apparatus, a number of packets for each type of packets from the first terminal to the second terminal; and
determining, by the second monitoring apparatus and based on the counted numbers, packets to be monitored by the second monitoring apparatus from among packets to the second terminal.

6. The network monitoring method as set forth in claim 5, wherein the first and second condition include a condition that a header of a packet from the first terminal to the second terminal includes predetermined information.

7. The network monitoring method as set forth in claim 5, wherein the first condition includes a condition that a time period between a time when a packet from the apparatus outside the network to the first terminal was obtained and a time when a packet from the first terminal to the second terminal was obtained is equal to or shorter than a first time period, and
the second condition includes a condition that a time period between a time when a packet from the first terminal to the second terminal was obtained and a time when a packet from the second terminal to the apparatus outside the network was obtained is equal to or shorter than a second time period.

8. The network monitoring method as set forth in claim 5, wherein the information on the first plurality of packets and the information on the second plurality of packets include at least one of an IP (Internet Protocol) address, a TCP (Transmission Control Protocol) port number, a TCP sequence number, a multiplex ID (IDentifier) in a SMB (Server Message Block) header, and a command sequence number in the SMB header.

* * * * *